United States Patent
Savchenko et al.

(10) Patent No.: US 10,921,334 B2
(45) Date of Patent: Feb. 16, 2021

(54) SYSTEM, METHOD AND COMPUTER PROGRAM PRODUCT FOR CLASSIFYING DEFECTS

(71) Applicant: Applied Materials Israel Ltd., Revohot (IL)

(72) Inventors: Kirill Savchenko, Lod (IL); Assaf Asbag, Alfei Menashe (IL); Boaz Cohen, Lehavim (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 379 days.

(21) Appl. No.: 15/933,306

(22) Filed: Mar. 22, 2018

(65) Prior Publication Data
US 2019/0293669 A1    Sep. 26, 2019

(51) Int. Cl.
G01N 35/00    (2006.01)
G06N 20/00    (2019.01)

(52) U.S. Cl.
CPC ........ *G01N 35/00623* (2013.01); *G06N 20/00* (2019.01); *G01N 2035/00653* (2013.01)

(58) Field of Classification Search
None
See application file for complete search history.

(56) References Cited

U.S. PATENT DOCUMENTS 6,763,130 B1 *  7/2004  Somekh .......... G05B 19/41875
                                                    382/145

OTHER PUBLICATIONS

Machine-Learning-Based Identification of Defect Patterns in Semiconductor Wafer Maps: An Overview and Proposal, 2014, IEEE 28th International Parallel & Distributed Processing Symposium Workshops, IEEE Computer Society, p. 420-429 (Year: 2014).*
Sugiyama, M. et al., "Direct importance estimation for covariate shift adaptation," Annals of the Institute of Statistical Mathematics, 2008, 60(4), pp. 699-746.

* cited by examiner

*Primary Examiner* — Roy Y Yi
(74) *Attorney, Agent, or Firm* — Lowenstein Sandler LLP

(57) ABSTRACT

An examination system, a method of obtaining a training set for a classifier, and a non-transitory computer readable medium, the method comprising: upon receiving in a memory device object inspection results comprising data indicative of potential defects, each potential defect of the potential defects associated with a multiplicity of attribute values defining a location of the potential defect in an attribute space: sampling by the processor a first set of defects from the potential defects, wherein the defects within the first set are dispersed independently of a density of the potential defects in the attribute space; and obtaining by the processor a training defect sample set comprising the first set of defects and data or parameters representative of the density of the potential defects in the attribute space.

12 Claims, 7 Drawing Sheets

SYSTEM, METHOD AND COMPUTER PROGRAM PRODUCT FOR CLASSIFYING DEFECTS

TECHNICAL FIELD

The presently disclosed subject matter relates to examining objects (e.g., wafers, reticles, etc.), and more particularly to classifying defects within an object.

BACKGROUND

Current demands for high density and performance associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including frequent and detailed inspection of the devices while they are still in the form of semiconductor wafers.

The term "object" used in this specification should be expansively construed to cover any kind or specimen of wafer, masks, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within an object.

The complex manufacturing process of objects is not error-free and such errors may cause faults in the manufactured objects. The faults may include defects that can harm operation of the object, and nuisances, which may be defects, but do not cause any harm or malfunction of the manufactured unit. By way of non-limiting examples, defects may be caused during the manufacturing process, due to faults in the raw material, mechanical, electrical or optical errors, human errors or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, defects may be classified into one of a number of classes, such as a particle, a scratch, process, or the like.

Unless specifically stated otherwise, the term "examination" used in this specification should be expansively construed to cover any kind of detection and/or classification of defects in an object. Examination is provided by using non-destructive inspection tools during or after manufacture of the object to be examined. By way of non-limiting example, the examination process can include scanning (in a single or in multiple scans), sampling, reviewing, measuring, classifying and/or other operations provided with regard to the object or parts thereof, using one or more inspection tools. Likewise, examination can be provided prior to manufacture of the object to be examined and can include, for example, generating an examination recipe(s). It is noted that, unless specifically stated otherwise, the term "examination", or its derivatives used in this specification, is not limited with respect to the size of the inspected area, or to the speed or resolution of the scanning A variety of non-destructive inspection tools includes, by way of non-limiting example, optical inspection tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least some of the defects detected during the inspection phase are, typically, captured at relatively low speed and/or high-resolution, thereby enabling classification and, optionally, other analyses of the at least some of the defects. In some cases both phases can be implemented by the same inspection tool, and, in some other cases, these two phases are implemented by different inspection tools.

SUMMARY

Certain embodiments of the presently disclosed subject matter provide advantages in examining an object while overcoming the non-identically independently distribution problem. In accordance with the disclosure, defects of rare classes are also represented in the training set, thus the classifier can classify defects into these classes. However, the relative weight of these classes is incorporated into the training set, such that defects are less likely to be classified to these classes than to more frequent classes.

One aspect of the disclosed subject matter relates to an examination system comprising: a classification tool, configured to: receive object inspection results comprising data indicative of potential defects, each potential defect of the potential defects associated with a multiplicity of attribute values defining a location of the potential defect in an attribute space; sample a first set of defects from the potential defects, wherein the defects within the first set are dispersed independently of a density of the potential defects in the attribute space; obtain a training defect sample set comprising the first set of defects and data or parameters representative of the density of the potential defects in the attribute space; and based on the defect sample set, obtain classification results useable for selecting potential defects for review; and a review tool configured to review the potential defects selected for review. Within the examination system, obtaining the classification results optionally comprises: for each defect of the training defect sample set, receiving a label informative of a respective class; training a classifier upon the training defect sample set to obtain a trained classifier; and applying the trained classifier to a second set of potential defects to obtain the classification results useable for selecting the potential defects for review.

Another aspect of the disclosed subject matter relates to a method of obtaining a training set for a classifier, using a processor operatively connected to a memory, the method comprising: upon receiving in the memory object inspection results comprising data indicative of potential defects, each potential defect of the potential defects associated with a multiplicity of attribute values defining a location of the potential defect in an attribute space: sampling by the processor a first set of defects from the potential defects, wherein the defects within the first set are dispersed independently of a density of the potential defects in the attribute space; and obtaining by the processor a training defect sample set comprising the first set of defects and data or parameters representative of the density of the potential defects in the attribute space. The method can further comprise: for each defect of the training defect sample set, receiving by the processor a label informative of a respective class; and training by the processor a classifier upon the training defect sample set to obtain a trained classifier, thereby obtaining a trained classifier usable for selecting defects for review. The method can further comprise: applying by the processor the trained classifier to a second set of defects, to obtain classification results useable for selecting defects for review from the potential defects; and selecting by the processor the defects for review based on the classification results. The method can further comprise: reviewing defects of the training defect sample set by a review tool. Within the method, sampling the first set of defects optionally comprises ensuring that a minimal distance between any two defects in the first set of defects exceeds a threshold. Within the method, obtaining the training defect sample set optionally comprises assigning a weight to each defect of the first set of defects, wherein the weight is indicative of a density of potential defects in an environment of the defect.

Yet another aspect of the disclosed subject matter relates to a non-transitory computer readable medium comprising instructions that, when executed by a computer, cause the computer to perform a method of examination of a semiconductor specimen, the method comprising: upon receiving in the memory object inspection results comprising data indicative of potential defects, each potential defect of the potential defects associated with a multiplicity of attribute values defining a location of the potential defect in an attribute space: sampling by a processor a first set of defects from the potential defects, wherein the defects within the first set are dispersed independently of a density of the potential defects in the attribute space; and obtaining by the processor a training defect sample set comprising the first set of defects and data or parameters representative of the density of the potential defects in the attribute space.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
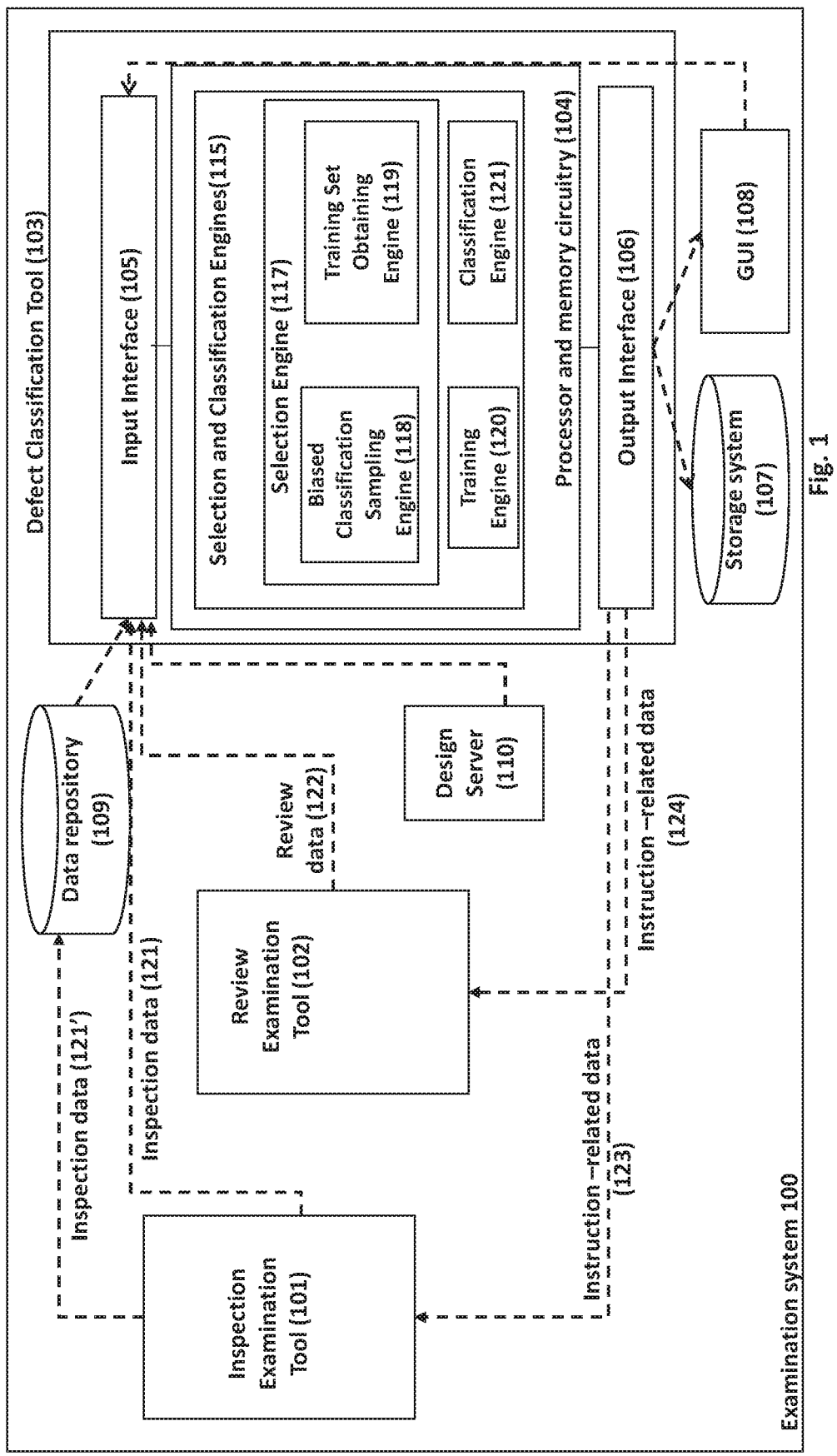
FIG. 1 illustrates a block diagram of an examination system, in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "calculating", "generating", "assigning", "selecting" or the like, refer to the action (s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the classification tool and Processor and Memory Circuitry (PMC) therein disclosed in the present application.

The term "classification" used in this specification should be expansively construed to cover any kind of assigning items into a collection of classes, such that each item is assigned to one class. The classes may be defined by a user or otherwise received. A classifier may be trained upon a training set, such that further items can be classified according to their similarity or dissimilarity to items from the training set or to characteristics of the classes determined on the training.

When examining objects, each defect may be characterized by values assigned to a multiplicity of attributes, such as size, color, background color, or the like. A classifier may be trained and classification may be based on the vicinity between items, or on the vicinity between an item and characteristics of the classes. Vicinity may be defined in accordance with an applicable distance function, for example a distance defined in the attribute space and the possible values for each attribute.

Each defect may thus be automatically classified into one of a number of classes, such as a particle, a scratch, process, or the like, based on its attribute values.

When manufacturing objects such as chips, defects can pose a serious problem. While some types of defects are non-problematic, others may be considered serious and even show-stoppers and render the chip unusable. Thus, it is highly important to classify the defects into known types, so that defects of some types get the required attention and are verified. Non-accurate classification can thus lead to not verifying important defects on one hand, and wasting resources including time and labor on the other hand. Since the time and other resources allotted for verification is limited, wasting resources on incorrectly classified defects can lead to insufficient testing resources remaining for the more important defects. Thus, correctly training a classifier for defect classification is highly required.

The terms "non-transitory memory" and "non-transitory storage medium" used herein should be expansively construed to cover any volatile or non-volatile computer memory suitable to the presently disclosed subject matter.

The term defect in the context of an object, as used in this specification should be expansively construed to cover any kind of abnormality or undesirable feature formed on or within a specimen.

The term potential defect, as used in this specification should be expansively construed to cover any kind of a location or artifact within an object, which may be received from an examination tool, a user or another source, and which may or may not be a defect, wherein a defect may be harmful or harmless (a nuisance).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a generalized block diagram of an examination system in accordance with certain embodiments of the presently disclosed subject matter. The examination system 100 illustrated in FIG. 1 can be used for examination of an object (e.g. of a wafer and/or parts thereof) as a part of specimen fabrication. Examination can be part of the object fabrication, and can be carried out during manufacturing the object, or afterwards. The examination system can comprise a variety of examination tools, for example, one or more inspection tools 101 configured to capture inspection images (typically, at relatively high-speed and/or low-resolution), and one or more review tools 102 configured to capture review images of at least part of defects detected by inspection tools 101 (typically, at relatively low-speed and/or high-resolution).

An object can be examined by inspection tool 101 (e.g. an optical inspection system, low-resolution SEM, etc.). The resulting images and/or derivatives can be processed (optionally together with other data as, for example, design data and/or defect classification data) to select potential defects for review.

Illustrated examination system 100 comprises a computer-based automated defect classification tool (referred to hereinafter also as a classifier) 103 capable of automatically classifying defects into a plurality of classes. Defect classification tool 103 can be operatively connected to one or more inspection tools 101 and/or one or more review tools 102. Optionally, classifier 103 can be a standalone tool, or fully or partly integrated with or hosted by one or more review tools 102. Classifier 103 can be further operatively connected to design server 110 and/or data repository 109.

By way of non-limiting example, classification may have different purposes. For example, a collection of potential defects may be received from an inspection examination tool 101, and based upon classification results of the potential defects, some of the defects may be selected for review by review tools 102. The classification results can also be used to establish Pareto in order to identify excursions in statistical process control (SPC), filter false defects from true defects, identify specific defects of interest (DoI) and/or otherwise in accordance with classification purposes.

Classifier 103 comprises a processor and memory circuitry (PMC) 104 operatively connected to a hardware-based input interface 105 and to a hardware-based output interface 106. PMC 104 is configured to provide processing necessary for operating the classifier as further detailed below, and comprises a processor and a memory (not shown separately within PMC). The operation of classifier 103 and PMC 104 is further detailed with reference to FIGS. 2-8B below.

The PMC 104 can be configured to execute several functional modules in accordance with computer-readable instructions implemented on a non-transitory computer-readable storage medium. Such functional modules are referred to hereinafter as comprised in the processing circuitry. PMC 104 can comprise selection and classification engines 115, configured to select part of the defects provided by inspection system tool 101 to be reviewed by review tool 102, using a classifier.

Selection and classification engines 115 can comprise selection engine 117 configured to select defects from the defects provided by inspection system tool 101, raining engine 120 configured to train classification engine 121 upon the selected defects, and classification engine 121 configured to classify further defects.

Training engine 120 is capable of receiving a training set, comprising defects and labels thereof, the labels indicating the class with which each defect is associated, and determining separation planes to be used by a classifier. The separation planes form sub-spaces within the defect attribute space, such that all defects in the same sub-space are associated with the same class. The better the training set represents the test set, the better is the classification, since the separation planes as determined upon the training set are applicable to the test set.

Classification engine 121 is capable of automatically classifying defects into a plurality of classes in accordance with the separation planes as determined during training. Classifier engine 121 can be further configured to define, for each given defect, a confidence level indicative of probability that the defect belongs to a certain class, and to assign the given defect to the certain class if the confidence level meets the respective confidence thresholds.

Selection engine 117 can comprise biased classification sampling engine 118, for selecting defects from the potential defects which were provided by inspection system tool 101 while overcoming non identically independently distribution (IID) problems detailed below, thus reducing the importance of the density of the potential defects, in order to select also potential defects which are of rarer types despite their lower density; and training set obtaining engine 121 for obtaining a training set which makes the training set representative also of the potential defect density, in order for the training set to better represent test sets, and provide lesser representation of the rarer types than of the frequent types.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of examination tools 101 and/or 102, data repository 109, storage system 107 and/or GUI 108 can be external to examination system 100 and operate in data communication with classifier 103 via input interface 105 and output interface 106. Classifier 103 can be implemented as a stand-alone computer(s) to be used in conjunction with one or more examination tools. Optionally, classifier 103 can operate on pre-acquired inspection data 121' stored in data repository 109 and/or storage system 107. Alternatively or additionally, the respective functions of classifier 103 can, at least partly, be integrated with one or more examination tools, process control tools, recipe generation tools, systems for automatic defects review and/or classification, and/or other systems related to examination.

In the discussion below, unless specifically indicated otherwise, the terms defect and potential defect are used interchangeably, since the discussion relates to potential defects received from an inspection tool, wherein it is unknown whether each represents a real defect or a false alarm.

Non-IID sampling, also referred to as covariate shift, is a state in which the train and test samples have different spatial distributions, but the conditional probability of a label (for example a class, or a true/false defect), i.e., the probability that an item is of a particular type is the same in the training set and in the testing set. Ignoring covariate shift when building a classifier can yield poor performance.

Figure 2A:
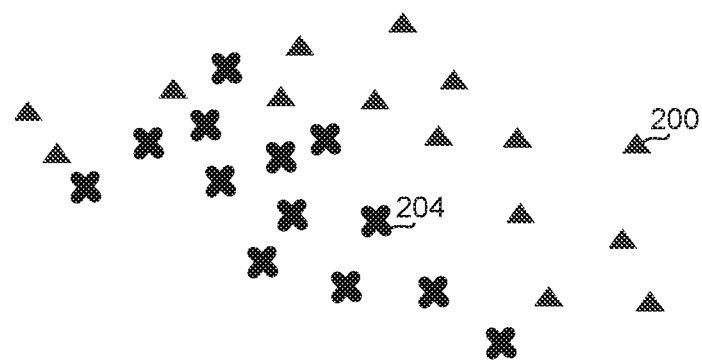
FIGS. 2A-2C show an illustrative example of a non-identically independently distribution (IID) problem in a two-dimensional attribute space.
Figure 2B:
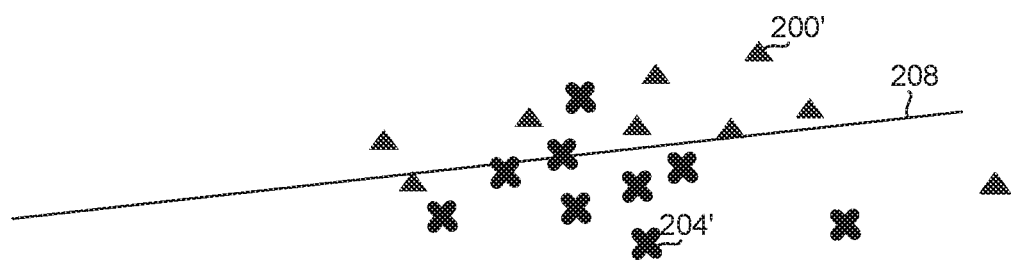
Figure 2C:
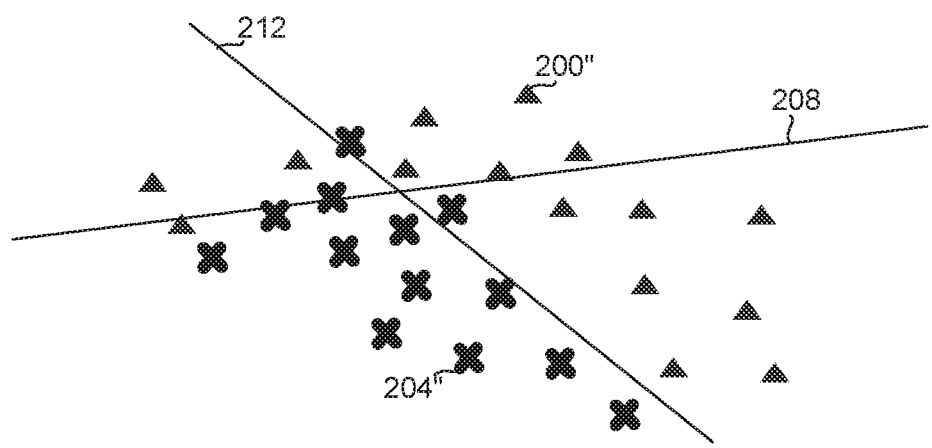

Referring now to FIGS. 2A-2C exemplifying the covariate shift problem in a two dimensional attribute space. It will be appreciated, however, that when examining objects, the attribute space dimensions are defined by the defect attributes, wherein there are typically significantly more than two dimensions, for example between tens and hundreds or even thousands of dimensions.

FIG. 2A shows a collection of defects represented by their locations in the exemplified two dimensional attribute space and referred to also as "locations" in a context of attribute space. There are illustrated two classes of defects, class 200 indicated as a triangle, and class 204 indicated as an X. However, it is noted that the class associated with each defect is unknown, and it is required to select defects for a training set, label the training set and train a classifier upon the training set, after which the classifier can classify a test set, i.e., assign the defects of the test set to their respective classes.

FIG. 2B shows fewer locations, selected as the training set, wherein a classifier trained upon this training set is likely to classify defects in accordance with separation line 208 (if the attribute space is of more than two dimension then one or more separation planes are determined) which classifies correctly most of the training set. However, when a classifier operating in accordance with separation line 208 is used for classifying the whole collection, it is seen that due to the different distribution of the classes within the whole set, line 208 classifies the population quite poorly, while line 212 would have provided much better results.

Thus, although the percentage of defects of each class is substantially the same in the whole collection as shown in FIG. 2A and in the training set as shown in FIG. 2B, the spatial distribution is very different. Thus, a separation plane which is efficient in classifying the training set provides poor classification results when applied to the whole set.

FIGS. 3A-3D show a schematic illustration of a different aspect of the problem, in which the probability of a defect to belong to a class in the training set is different from the probability in the test set.

Figure 3A:
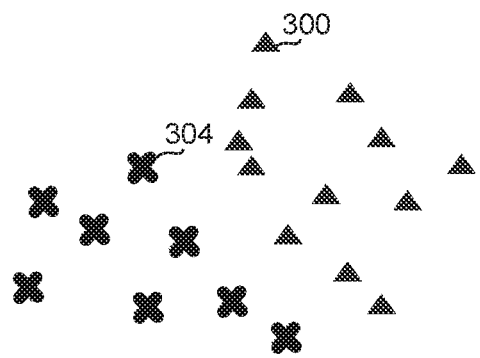
FIGS. 3A-3D show another illustrative example of the non IID problem in a two-dimensional attribute space.

FIG. 3A shows defects of two types, type 300 associated with triangles and type 304 associated with Xs. FIG. 3B shows the same defects as in FIG. 3A, with a separation line 308 upon which the classifier will operate to classify the defects.

Figure 3C:
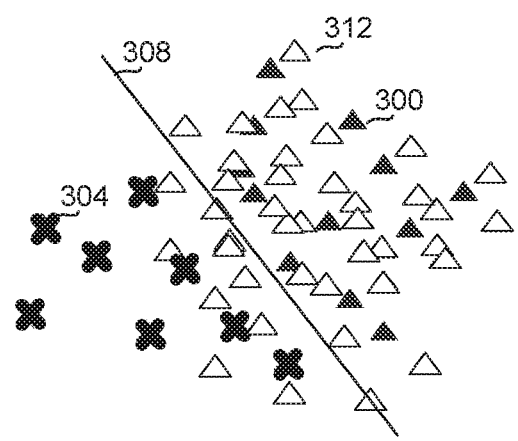
Figure 3B:
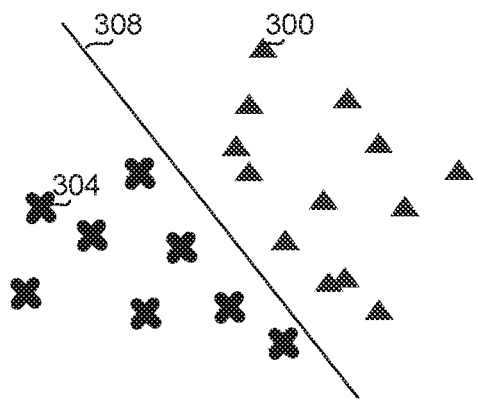

FIG. 3C shows the full set of potential defects to be used as a test set, including also defects 312 indicated as wireframe triangles, which are of the same class as defects 300. Applying separation line 308 to the full set provides poor results, wherein separation line 316 would provide better results, since the class distribution in the training set is significantly different from the class distribution in the test set.

Thus, in accordance with certain embodiments of the presently disclosed subject matter it may be required to create a training set in which defects of rarer types are also represented, and are not ignored due to their rarity and the probabilistic nature of the selection. However, once such defects are also selected, the overall distribution of the defect classes should still be considered, such that more defects of the frequent classes than of the rarer classes are selected, in order for the training set to represent test sets.

Figure 3D:
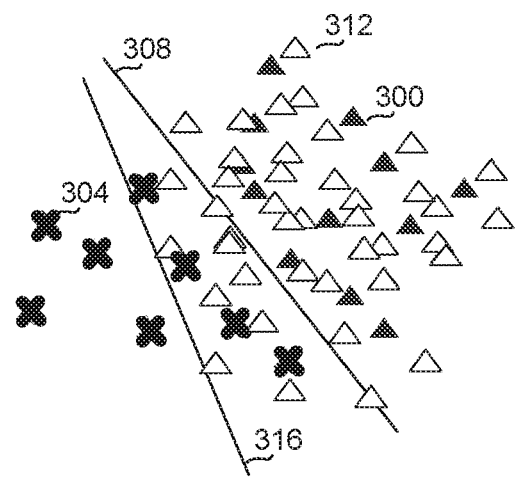

FIG. 3D shows separation line 308 as well as separation line 316, wherein separation line 316 would actually be a preferred option would information about all potential defects be available.

Figure 4A:
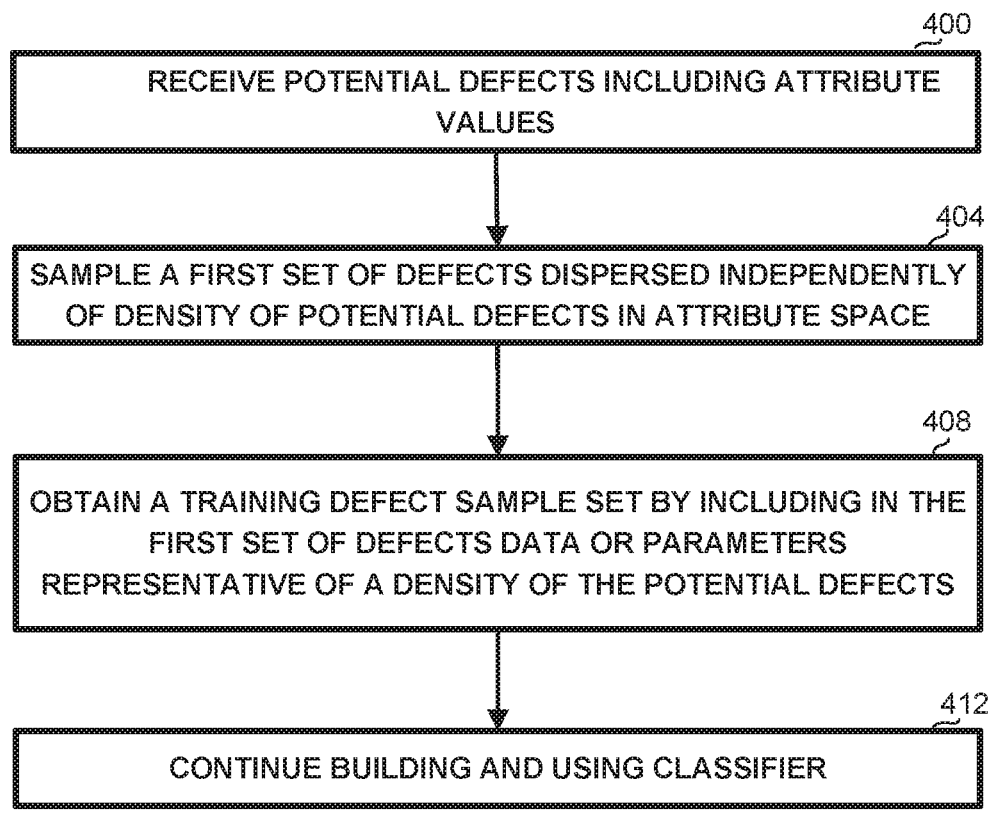
FIG. 4A shows a flow-chart of a method of selecting a training set, in accordance with certain embodiments of the presently disclosed subject matter.

Reference is now made to FIG. 4A, there is illustrated a flow-chart of a method of selecting a training set, in accordance with certain embodiments of the presently disclosed subject matter.

PMC 104 or biased classification sampling engine 118 are configured to execute the respective operations detailed below in accordance with computer-readable instructions implemented on a non-transitory computer-readable storage medium.

PMC 104 can receive (400) object inspection results, comprising data indicative of potential defects, each defect associated with a multiplicity of attribute values. The attribute values can define the location of the respective defect within an attribute space.

In some embodiments, PMC 104 can define an attribute sub-space based on the attribute values of the full set of defects. For example, the attribute sub-space can be defined by the minimal and maximal value for each dimension corresponding to a numeric attribute, by the minimal and maximal value for each dimension corresponding to a numeric attribute and further comprising margins of a certain percentage, by the values of discrete attributes, or the like.

Biased classification sampling engine 118 can sample (404) out of the potential defects, a first set of defects which are dispersed independently of the density of the potential defects in attribute space.

Sampling the first set independently of the density of the potential defects can be done in a number of ways.

Figure 5:
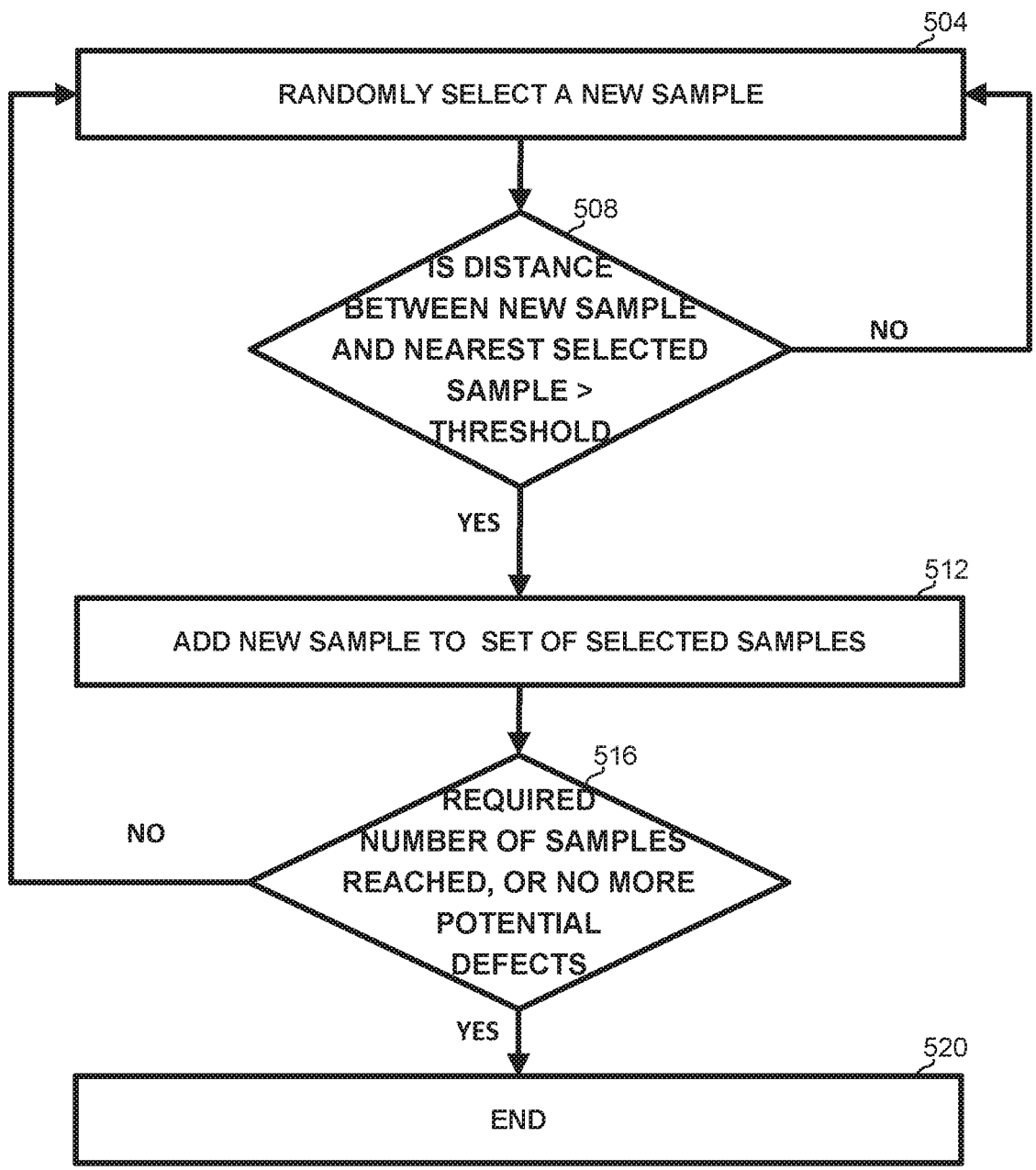
FIG. 5 is a generalized flow-chart of the nearest neighbor method for selecting a sample set regardless of the defect density, in accordance with certain embodiments of the presently disclosed subject matter.

Referring now to FIG. 5, demonstrating one exemplary method for sampling independently of the density.

Biased classification sampling engine 118 can randomly select (504) a sample from the potential defects.

Biased classification sampling engine 118 can determine (508) whether the distance between the new sample and its nearest neighbor, i.e., the minimal distance in attribute space between the newly selected sample and any of the previously selected samples, exceeds a threshold.

If the distance exceeds the threshold (or if the selected sample is the first sample), then biased classification sampling engine 118 may add (512) the new sample to the set of selected samples, otherwise biased classification sampling engine 118 may randomly select (504) another new sample.

If the new sample was added, then biased classification sampling engine 118 can determine (516) whether the required number of samples has been reached, or whether there are no more defects to select from. If any of these conditions holds, then the method ends (520), otherwise biased classification sampling engine 118 can randomly select a new sample (504).

Requiring that a minimal distance between a defect newly added to the sample set and all existing members of the sample set exceeds a threshold, provides for ensuring that the distance between any two defects in sample set exceeds the threshold, and thus provides for the sample set to represent a larger volume of the data, than the volume that would be provided by random sampling.

Figure 6A:
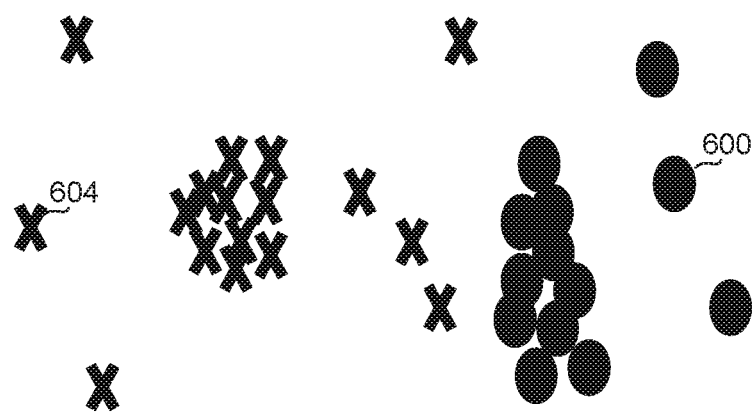
FIGS. 6A-6C show an illustrative example of the effect of the spatial uniform or inverse probability methods, in accordance with certain embodiments of the presently disclosed subject matter.
Figure 6B:
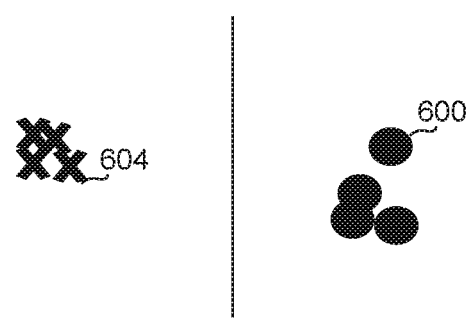
Figure 6C:
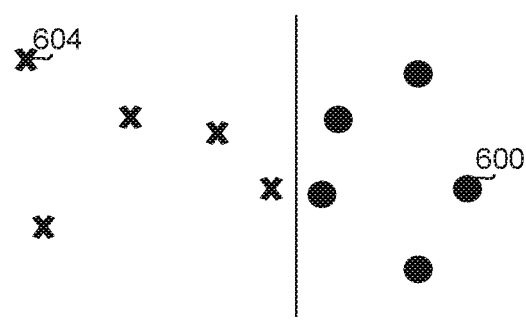

Referring now also to FIGS. 6A-6C demonstrating the effect of selecting defects independently of the density of the potential defects as detailed above. FIG. 6A shows a collection of defects of two types, defects of type 600 indicated as circles and defects of type 604 indicated as Xs. As detailed above, it is noted that the class associated with each defect is unknown. When sampling arbitrarily, the probability of defects from a dense area to be selected is higher than those of sparse area, since there are more of them. Thus, an arbitrary selection may yield the set shown in FIG. 6B, with the shown separation line. However, selecting points from the whole attribute sub-space in which the points are located, is likely to obtain the set shown in FIG. 6C, which indeed represents the whole attribute sub-space.

Referring now back to FIG. 4A. On step 404 a first set of defects has been selected, which is dispersed independently of the density of potential defects in attribute space, thus providing for the training set to represent the full set of the potential defects. However, in order for the training set to represent the full set, it may be required to give the appropriate significance to the original density of the potential defects, such that more common defects indeed have higher representation within the training set than defects which are more isolated in the attribute space and are thus associated with rarer classes.

Thus, training set obtaining engine 119 can obtain (408) a training defect sample set comprising, further to the first set, also data or parameters associated with the first set, representative of a density of the potential defects, thus eliminating the bias of the first set. The data or parameters can take multiple forms, for example a weight indicator can be assigned to each sample in the first set. The weight indicator can be determined by defining a volume in the attribute space around each sample, and determining the number of test samples in the volume. The weight can then be defined in accordance with this number, thus giving higher weight to defects sampled from dense areas, since they represent a larger number of defects. The weight can then be used when training the classifier as is known in the art.

Referring now back to FIG. 4A, PMC 104 can continue the building and using of the classifier (412) as is commonly done.

Figure 4B:
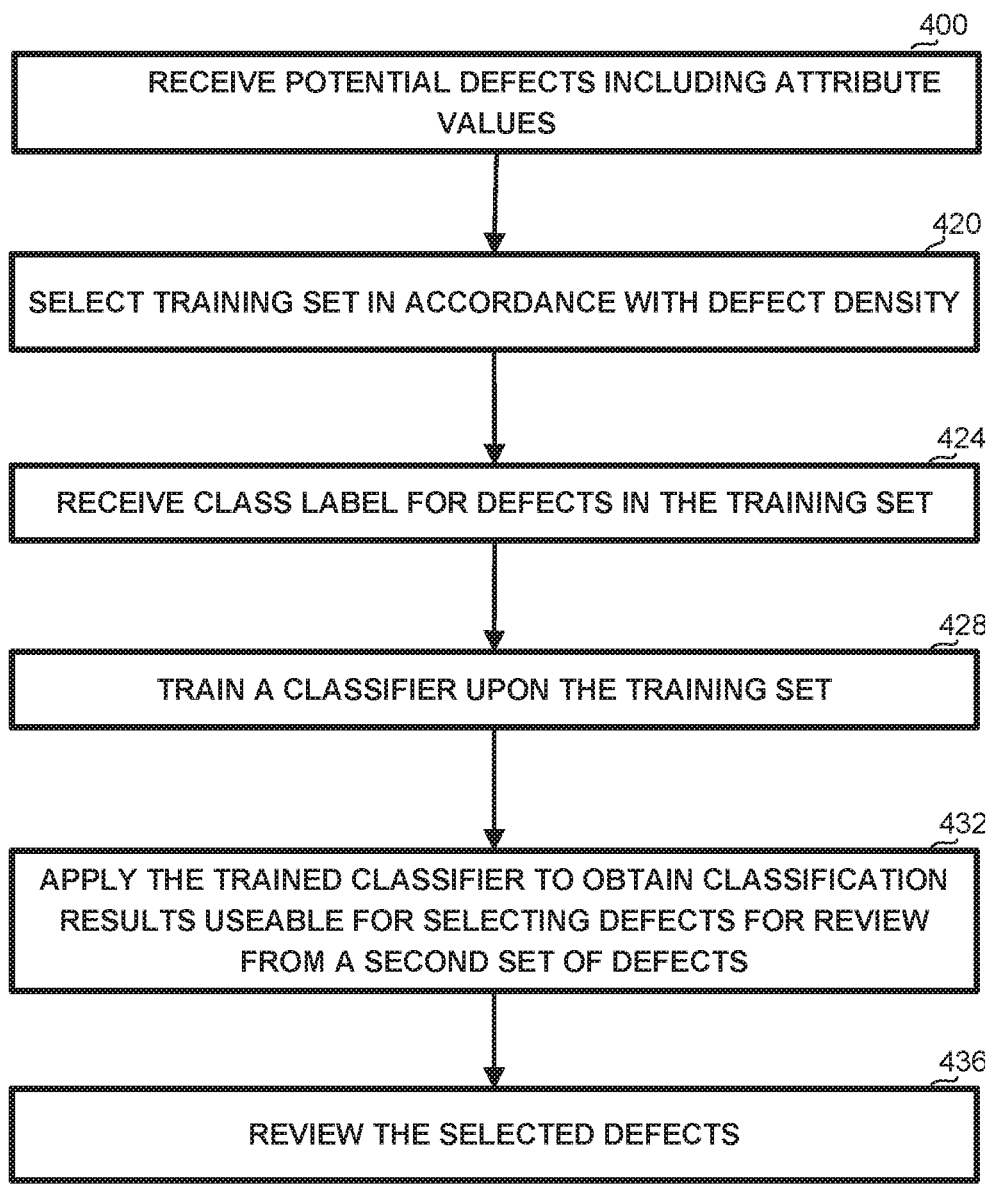
FIG. 4B shows a generalized flowchart of a method of training a classifier, in accordance with certain embodiments of the presently disclosed subject matter.

Referring now to FIG. 4B, showing a generalized flowchart of a method of training a classifier, in accordance with certain embodiments of the presently disclosed subject matter.

PMC 104 or biased classification sampling engine 118 are configured to execute the respective operations detailed below in accordance with computer-readable instructions implemented on a non-transitory computer-readable storage medium.

As detailed in association with FIG. 4A above, PMC 104 can receive (400) object inspection results, comprising data indicative of potential defects, each defect associated with a multiplicity of attribute values. The attribute values can define the location of the respective defect within an attribute space.

Biased classification sampling engine 118 is configured to select (420) a training set and optionally parameters in accordance with defect density, using sampling methods and bias elimination and parameters, for example as detailed in association with steps 404 and 408 of FIG. 4A above.

PMC 104 can receive class labels (424) for the defects within the training set as selected. The labels, indicative of a class with which each defect is associated, can be assigned by a human user, by another system, or in any other manner.

Training engine 120 can then train (428) a classification engine 121 upon the training set. The training is useful in determining separation planes between the defects of the training set, such that all defect within a multi-dimensional sub-space limited by the same set of separation planes are assigned to the same class. The same separation planes will be used by the classifier when classifying a test set. Thus, having a training set which is distributed similarly to the test set provides for high quality classification of the test set.

PMC 104 can apply (432) classifier 121 as trained to obtain classification results for a test set comprising possible defect locations, for example locations within the training set, locations received by PMC 104 which were not selected for the training set, or other locations, which may be received at a later time, for example during examination of another object. The classification results, which can indicate classes for defects within a second set of defects, can be useful in selecting defects for review. For example, defects can be selected which are of one or more particular classes, represent all classes, or the like.

Review examination tool 102 can review (436) the selected defects in order to determine whether they are true defects, their type, or other characteristics.

It will be appreciated that the disclosure is not limited to classifying defects and can be used for any classifier of items in any field.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. An examination system comprising:
   a classification tool, configured to:
   receive object inspection results comprising data indicative of potential defects, each potential defect of the potential defects associated with a multiplicity of attribute values defining a location of the potential defect in an attribute space;
   sample a first set of defects from the potential defects, wherein the defects within the first set are selected independently of a density of the potential defects in the attribute space, wherein to be selected independently of the density of the potential defects, a first potential defect from a first region in the attribute space is selected with a lower probability than a second potential defect from a second region in the attribute space, the first region having a higher density of the potential defects than the second region;
   obtain a training defect sample set comprising the first set of defects and one or more parameters representative of the density of the potential defects in the attribute space;
   based on the defect sample set, obtain classification results useable for selecting potential defects for review; and
   a review tool configured to review the potential defects selected for review.

2. The examination system of claim 1, wherein obtaining the classification results comprises:
   for each defect of the training defect sample set, receiving a label informative of a respective class;
   training a classifier upon the training defect sample set to obtain a trained classifier; and
   applying the trained classifier to a second set of potential defects to obtain the classification results useable for selecting the potential defects for review.

3. A method of obtaining a training set for a classifier, using a processor operatively connected to a memory, the method comprising:
   receiving, in the memory, object inspection results comprising data indicative of potential defects, each potential defect of the potential defects associated with a multiplicity of attribute values defining a location of the potential defect in an attribute space;
   sampling, by the processor, a first set of defects from the potential defects, wherein the defects within the first set are selected independently of a density of the potential defects in the attribute space, wherein to be selected independently of the density of the potential defects, a first potential defect from a first region in the attribute space is selected with a lower probability than a second potential defect from a second region in the attribute space, the first region having a higher density of the potential defects than the second region; and
   obtaining, by the processor, a training defect sample set comprising the first set of defects and one or more parameters representative of the density of the potential defects in the attribute space.

4. The method of claim 3, further comprising:
   for each defect of the training defect sample set, receiving by the processor a label informative of a respective class; and
   training by the processor a classifier upon the training defect sample set to obtain a trained classifier, thereby obtaining a trained classifier usable for selecting defects for review.

5. The method of claim 4, further comprising:
   applying by the processor the trained classifier to a second set of defects, to obtain classification results useable for selecting defects for review from the potential defects; and
   selecting by the processor the defects for review based on the classification results.

6. The method of claim 5, further comprising reviewing defects of the training defect sample set by a review tool.

7. The method of claim 3, wherein sampling the first set of defects comprises ensuring that a minimal distance between any two defects in the first set of defects exceeds a threshold.

8. The method of claim 3, wherein obtaining the training defect sample set comprises assigning a weight to each defect of the first set of defects, wherein the weight is indicative of a density of potential defects in an environment of the defect.

9. A non-transitory computer readable medium comprising instructions that, when executed by a computer, cause the computer to perform a method of examination of a semiconductor specimen, the method comprising:
   receiving, in a memory, object inspection results comprising data indicative of potential defects, each potential defect of the potential defects associated with a multiplicity of attribute values defining a location of the potential defect in an attribute space;
   sampling, by a processor communicatively coupled to the memory, a first set of defects from the potential defects, wherein the defects within the first set are selected independently of a density of the potential defects in the attribute space, wherein to be selected independently of the density of the potential defects, a first potential defect from a first region in the attribute space is selected with a lower probability than a second potential defect from a second region in the attribute space, the first region having a higher density of the potential defects than the second region; and
   obtaining, by the processor, a training defect sample set comprising the first set of defects and one or more parameters representative of the density of the potential defects in the attribute space.

10. The examination system of claim 1, wherein the one or more parameters representative of the density of the potential defects in the attribute space comprises a number of the potential defects within the first region in the attribute space, the first region having a predefined volume in the attribute space.

11. The method of claim 3, wherein the one or more parameters representative of the density of the potential defects in the attribute space comprises a number of the potential defects within the first region in the attribute space, the first region having a predefined volume in the attribute space.

12. The non-transitory computer readable medium of claim 9, wherein the one or more parameters representative of the density of the potential defects in the attribute space comprises a number of the potential defects within the first region in the attribute space, the first region having a predefined volume in the attribute space.

* * * * *